(12) United States Patent
Rasmussen (10) Patent No.: US 10,827,883 B2
(45) Date of Patent: Nov. 10, 2020

(54) UTENSIL FOR MATERIAL EXTRACTION FROM CONTAINERS

(71) Applicant: Rasmussen Enterprises LLC, Monroeville, PA (US)

(72) Inventor: Chris P. Rasmussen, Monroeville, PA (US)

(73) Assignee: RASMUSSEN ENTERPRISES LLC, Monroeville, PA (US)

( * ) Notice: Subject to any disclaimer, the term of this patent is extended or adjusted under 35 U.S.C. 154(b) by 138 days.

(21) Appl. No.: 15/866,994

(22) Filed: Jan. 10, 2018

(65) Prior Publication Data

US 2018/0192826 A1 Jul. 12, 2018

Related U.S. Application Data

(60) Provisional application No. 62/445,457, filed on Jan. 12, 2017.

(51) Int. Cl.
*A47J 43/28* (2006.01)
*A47G 19/18* (2006.01)
*A47G 21/06* (2006.01)

(52) U.S. Cl.
CPC .......... *A47J 43/288* (2013.01); *A47G 19/186* (2013.01); *A47G 21/06* (2013.01); *A47J 43/287* (2013.01)

(58) Field of Classification Search
CPC ......... B01F 13/002; B44D 3/06; A47L 13/08; A47L 17/00; A47L 17/1706; A47J 43/288; A47J 43/287
See application file for complete search history.

(56) References Cited

U.S. PATENT DOCUMENTS

| 2,860,858 | A | * | 11/1958 | Kurs | ..................... B01F 13/002 366/129 |
| 2,900,656 | A | * | 8/1959 | Tupper | ................... A47J 43/288 15/245 |
| 3,189,070 | A | | 6/1965 | Darling | |
| 3,416,689 | A | | 12/1968 | Greenfield | |
| D318,989 | S | * | 8/1991 | Risner | ............................ D32/46 |

(Continued)

FOREIGN PATENT DOCUMENTS

CA 2714162 A1 2/2012

OTHER PUBLICATIONS

BRIX, CanPop beverage can opening, retrieved from http://www.brixdesign.com/default.asp?Action=Details&Item=423 on Jan. 10, 2018, Denmark.

*Primary Examiner* — Shay Karls
(74) *Attorney, Agent, or Firm* — Dinsmore & Shohl LLP (57) ABSTRACT

A utensil for opening and extracting food from a container includes an elongated handle having a first end and a second end. The utensil further includes a pliant blade including one or more features for removing contents from a container and the pliant blade is coupled to the first end of the elongated handle. The pliant blade is defined by an edge enclosing an inner portion. A slit extends from the edge of the pliant blade inwardly into a section of the inner portion and a contoured edge is disposed along a portion of the edge of the pliant blade where the contoured edge corresponds to one or more surface features of a sidewall of a container. The utensil further includes a pull-tab opener disposed on the second end of the elongated handle for accessing and separating a pull-tab from the surface of a lid.

20 Claims, 9 Drawing Sheets

(56) References Cited

U.S. PATENT DOCUMENTS

| | | | | |
|---|---|---|---|---|
| 5,626,266 | A | 5/1997 | Michelson | |
| 6,709,125 | B2 * | 3/2004 | Jarvis | B67B 7/403 |
| | | | | 362/119 |
| 7,603,740 | B2 * | 10/2009 | Goldsberry | B44D 3/16 |
| | | | | 15/236.05 |
| 9,072,410 | B2 * | 7/2015 | Sorenson | A47J 43/288 |
| 2004/0231087 | A1 * | 11/2004 | Siegel | A47L 13/08 |
| | | | | 15/236.09 |
| 2011/0131818 | A1 | 6/2011 | Lichty | |

* cited by examiner

FIG. 13C

UTENSIL FOR MATERIAL EXTRACTION FROM CONTAINERS

CROSS-REFERENCE TO RELATED APPLICATIONS

This application claims the benefit of U.S. Provisional Application No. 62/445,457, entitled "UTENSIL FOR FOOD EXTRACTION FROM CYLINDRICAL CONTAINERS," filed Jan. 12, 2017, the entirety of which is hereby incorporated by reference.

FIELD

The present disclosure relates to devices and methods for extracting material from containers, and more specifically, extracting material from containers having particular shape characteristics.

BACKGROUND

Containers, such as cans or the like, may be shaped such that the containers have features. Existing utensils that are used for the extraction of material from a container may not be particularly contoured to correspond to the shape characteristics of a container. In addition, a pull-tab of a container may be difficult to access.

SUMMARY

In one embodiment, a utensil includes an elongated handle and a pliant blade. The elongated handle has a first end and a second end, and the pliant blade includes one or more features for removing contents from a container. The pliant blade is coupled to the first end of the elongated handle. The utensil further includes a pull-tab opener disposed on the second end of the elongated handle.

In another embodiment, a utensil includes an elongated handle having a first end and a second end, a pliant blade coupled to the first end of the elongated handle. The pliant blade includes one or more features for removing contents from a container and the pliant blade includes an edge enclosing an inner portion. The utensil further includes a slit extending from the edge of the pliant blade inwardly into a section of the inner portion.

In yet another embodiment, a utensil includes an elongated handle having a first end and a second end and a pliant blade coupled to the first end of the elongated handle. The pliant blade includes an edge enclosing an inner portion. The utensil further includes a slit extending from the edge of the pliant blade inwardly into a section of the inner portion and a contoured edge disposed along a portion of the edge of the pliant blade. The contoured edge corresponds to one or more surface features of a sidewall of a container. The utensil further includes a pull-tab opener disposed on the second end of the elongated handle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Containers, for example, bowls, cans, or jars for food, pet food, paints, lacquers or other materials of a viscous nature or the like, come in various shapes and sizes. For example, such containers may be cylindrical in shape and constructed with ribbed sidewalls, indentations in the bottom/top portions and/or the like. The ribbed sidewalls and indentations or other contours, which form the structure of the container, may trap contents (e.g. food) therein. The contents trapped in these contours can be difficult to remove with existing utensils, and in some instances, more than one utensil is needed to remove all the contents. As a result, additional unnecessary utensils need to be cleaned after the contents are extracted and/or a portion of the contents is wasted/discarded. Moreover, when a user peels back or removes a lid to the container, a lip that is located on the sidewalls of the container may be exposed. The lip may be sharp, presenting an inconvenient inward extension from the sidewall of the container creating a difficult and potentially dangerous situation for removing contents that are located on an underside of the lip. That is, a sharp lip can slice soft utensils, fingers, or the like when attempting to remove contents that are located on an underside of the lip.

In addition, some containers contain a pull-tab for removing the lid from the container. The pull-tab may be difficult to access or separate from the surface of the lid of the container for some users, particularly elderly users and users having arthritis, mobility issues, musculoskeletal strength issues, and/or the like. Additionally, the pull-tab may also cause a user to break his/her fingernail while attempting to lift the pull tab, result in damage to utensils while attempting to lift the pull tab, require additional specialized utensils, and/or the like.

Furthermore, certain spatulas, scrapers, or other utensils may not be suited for removing the contents from the container because they are not particularly contoured to correspond to the shape characteristics of the container, may become caught, cut, and/or the like on the lip, may be unable to remove the food from the underside of the lip, may not be particularly suited to scoop the contents from the container, may be constructed of a material that is too flexible or too rigid, and/or may not contain features that allow for pull-tab access and/or separation from the surface of the lid.

The embodiments described herein are generally directed to a utensil that is particularly suited for removing contents from a cylindrical container having one or more surface features in which at least a portion of the contents may be located. The utensil has a first end that is particularly shaped, sized, and contoured to remove most (if not all) of the contents from the container, including contents located in hard-to-extract areas, such as underneath a lip, between ribs, or within a recess of the container, e.g., on the bottom of the container. In addition, the utensil has a second end that may be particularly shaped, sized, and contoured such that a user can use the second end to pry up a pull-tab on the container such that the pull-tab can be easily accessed for removing the lid of the container.

Figure 1:
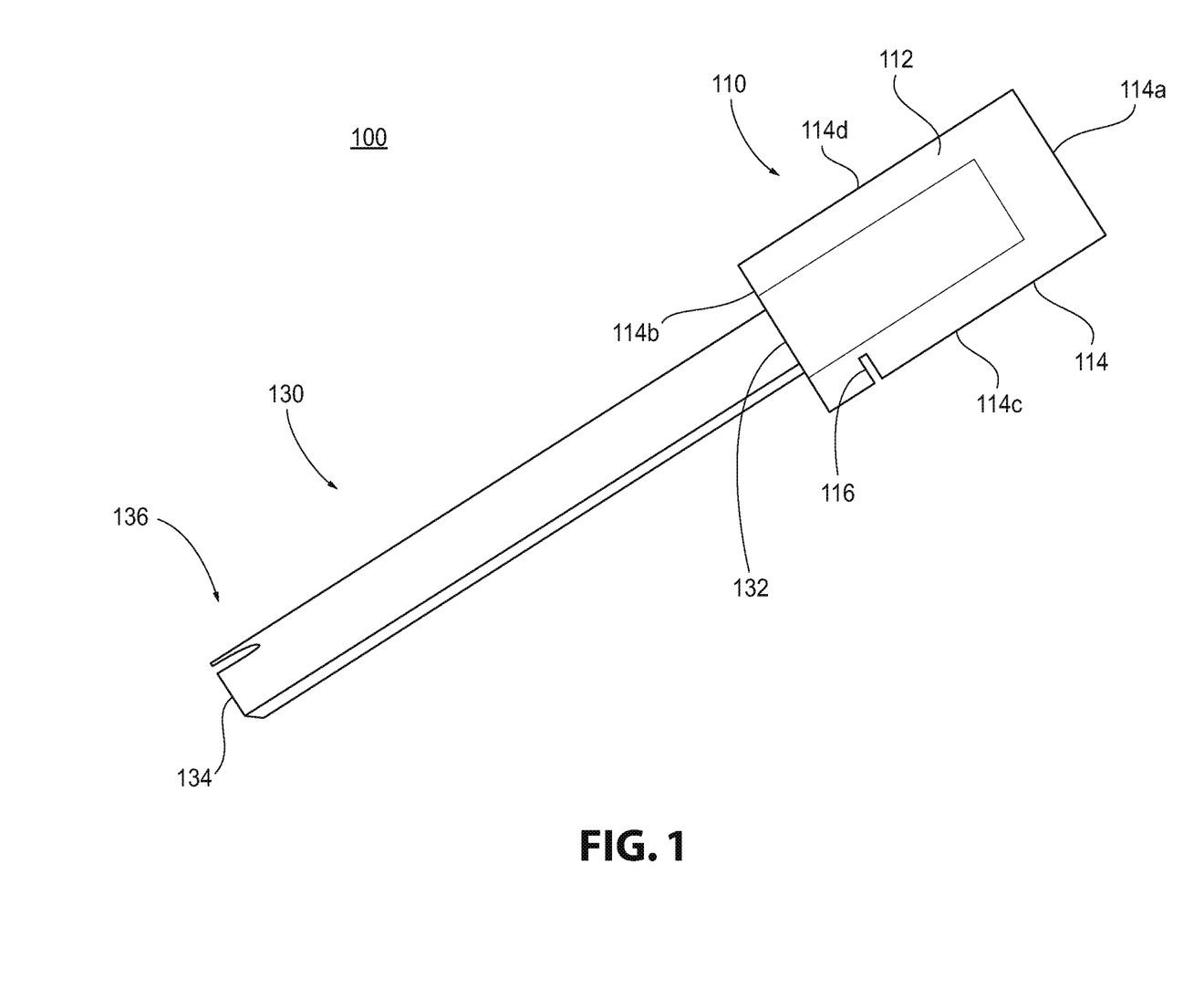
FIG. 1 depicts an illustrative example of a utensil according to one or more embodiments shown and described herein.

FIG. 1 depicts an illustrative example of a utensil 100. The utensil 100 may be used for removing material from cylindrical containers of various sizes, for example common, conventional-sized (store purchasable) food cans, jars or other containers. Accordingly, the use of the utensil 100 may be useful for other tasks, for example, without limitation, removing residual contents from lids and/or pull-can tops, scraping the sidewall of a mixing bowl to remove contents such as cookie dough, manipulating food that is cooking in a frying pan or pot on a stove, icing a cake, cleaning a container or the like. That is, the use of the utensil is not limited by the scope of the present disclosure.

In some embodiments, various features of the utensil 100 described herein may be particularly adapted for either right handed or left handed individuals. For example, certain features may be located on a side that is manipulable by a right-handed user, a side that is manipulable by a left-handed user, or both sides. In some embodiments, for example, a left-handed user may more easily manipulate the utensil 100 where the slit 116 is positioned on the lateral edge 114d as opposed to the slit 116 being positioned on lateral edge 114c (as shown in FIG. 1), particularly when the pliant blade 110 does not have a symmetrical shape such that the pliant blade 110 is designed to operate in a particular orientation.

As depicted in at least FIG. 1, the utensil 100 generally includes a pliant blade 110 coupled to an elongated handle 130. The pliant blade 110 includes an inner portion 112 defined by an edge 114 extending around the perimeter of the inner portion 112. The edge 114 may be defined by a plurality of interconnected edges 114, such as, for example, a distal edge 114a and a proximal edge 114b interconnected by a pair of lateral edges 114c and 114d. That is, a pliant blade may have a height defined as the distance between the distal edge 114a and the proximal edge 114b and a width defined as the distance between the pair of lateral edges 114c and 114d. The height and the width of the pliant blade 110 are not limited to the embodiments depicted and described herein. In some embodiments, the height of the pliant blade 110 may correspond to the height of the container for which it is adapted. Additionally, in some embodiments, the width of the pliant blade 110 is adapted to conform to the opening and internal volume of a container such that the utensil 100 may readily extract material therefrom.

Furthermore, in some embodiments, the pliant blade 110 includes a slit 116 extending from an edge 114, for example, a lateral edge of the pair of lateral edges 114c and 114d, to a depth d (FIG. 5), into a portion of the inner portion 112 of the pliant blade 110. Still referring to FIG. 1, the slit 116 provides for an efficient cleaning of material or removal of contents from underneath a lip of a container without damaging the pliant blade 110. However, while some embodiments depicted and described herein include a slit 116, some embodiments may not include a slit 116. In some embodiments, where the utensil 100 does not contain a slit 116, the height of the pliant blade 110 may correspond to a distance from the bottom of a container to underside of the lip of the container. The slit 116 will be described in more detail with reference to FIG. 5.

In some embodiments, the pliant blade 110 couples to a first end 132 of the elongated handle 130. The pliant blade 110 may be removably coupled to the elongated handle 130, such that multiple pliant blades may be interchanged with a single elongated handle 130. For example, a user may remove a first pliant blade from the elongated handle 130 and install a second pliant blade on the elongated handle 130. Having a removable and interchangeable pliant blade 110 offers the ability to adapt the utensil 100 to a container having a particular size, shape, surface feature design, or the like, without needing multiple utensils. Additionally, a removable and interchangeable pliant blade 110 may simplify cleaning such that when only the pliant blade 110 needs to be cleaned, the pliant blade 110 may be removed from the elongated handle 130 and then cleaned independently of the elongated handle 130.

In some embodiments, the first end 132 of the elongated handle 130 may extend into or through a portion of the pliant blade 110 to provide structure to the pliant blade 110. In some embodiments, the pliant blade 110 may be coupled to the elongated handle 130 via one or more fasteners or the like. The coupling between the elongated handle 130 and the pliant blade 110 is not limited by this disclosure, and any means of coupling the elongated handle 130 and the pliant blade 110, whether permanently or temporarily, is contemplated and included within the scope of the present disclosure.

In some embodiments, the elongated handle 130 also includes a second end 134. The second end 134 of the elongated handle 130 may include a pull-tab opener 136 disposed therein, which is described in more detail herein.

The elongated handle 130 may comprise one or more materials with a structure and strength capable of facilitating manipulation of the pliant blade 110 in the removal of content from a container. In some embodiments, the elongated handle 130 is a rigid strong (i.e., not brittle) material such as wood, metal, or plastic or the like. In some embodiments, the elongated handle 130 may be formed with one or more ergonomic features so that a user's hand (i.e., in some embodiments, the user's left or right hand) may securely grip the utensil 100 for use in extracting contents from the container. Similarly, one or more ergonomic features may be formed with the elongated handle 130 to provide a gripping location when using the utensil 100 for prying open a pull-tab lid. In some embodiments, the one or more ergonomic features are formed to be application independent. That is, the one or more ergonomic features may provide a gripping location regardless of whether the utensil 100 is used to extract contents from a container or pry open a pull-tab lid. For example, a portion of the elongated handle 130 between the first end 132 and the second end 134 may have a first thickness (e.g. a diameter) which is larger than and tapers down to a second thickness at each of the first and second ends 132 and 134 of the elongated handle 130. As such, the larger middle portion of the elongated handle 130 may provide a more secure grip for a user by better conforming to the user's hand and/or their fingers and palm independently.

The pliant blade 110 may comprise a material such as rubber, plastic (such as polyethylene, nylon, and polypropylene), silicone, wood, metal, or the like. In some embodiments, one or more materials may be mixed together or over molded to form the pliant blade 110. As such, in some embodiments, the pliant blade 110 may be constructed such that it has a durometer and/or strength, which is more rigid than the contents, which are being extracted from the container. Additionally, the utensil 100 is constructed to retain pliancy through wear and tear as a result of its use. This may be achieved by selecting specific materials for the pliant blade 110, which will not degrade or be damaged by the contents the utensil 100 is intended for use with. In some embodiments, the utensil 100 may be dishwasher safe, that is, for example, the materials of the utensil 100 may be resistant to dishwashing chemicals, heat, and water pressure. Additionally, the utensil 100 may have a mass sufficient to rest securely on a dishwashing rack during a washing cycle.

Although the pliant blade 110 is depicted in FIG. 1 as having a rectangular shape, the pliant blade 110 may be formed in a variety of shapes and sizes enabling removal of contents from containers of various sizes and shapes. As described in more detail herein, the pliant blade 110 may include contoured edges, one or more pliant extensions, a slit 116 or other features to fit flush against the sidewalls of a container for improved speed, efficiency, and completeness of the removal of the contents from the container. As such, in some embodiments, the pliant blade 110 may include curved edges or a scoop-shape contour. These features may be formed by altering the mold design for the pliant blade 110 to achieve desired end functionality. Additionally, the durometer (i.e., hardness) of the material may be varied across the inner portion 112 of the pliant blade 110. For example, the durometer of the material of the inner portion 112 may be greater than the durometer of the material closer to the edge 114 of the pliant blade 110. As another example, the edge 114 of the pliant blade 110 may include a material (e.g., an over molded portion) along the edge 114 that has a durometer greater than the material adjacent the edge 114. As such, the material (e.g., an over molded portion) may make the pliant blade 110 more resistant to cuts and abrasions caused during use, for example, from the sharp edge of the lip of the container.

In some embodiments, the utensil 100 is made of material that is resistant to staining and discoloring after multiple uses. For example, materials such as polyethylene terephthalate (PET), polybutylene terephthalate (PBT), polyetheretherketone (PEEK), or the like may be resistant to staining and discoloring after multiple uses. Additionally, a hydrophobic material may also be resistant to staining and discoloring. In some embodiments, the utensil 100 is resistant to bending and breaking, for example, when more force than necessary is applied to the utensil 100 during operation.

Figure 2:
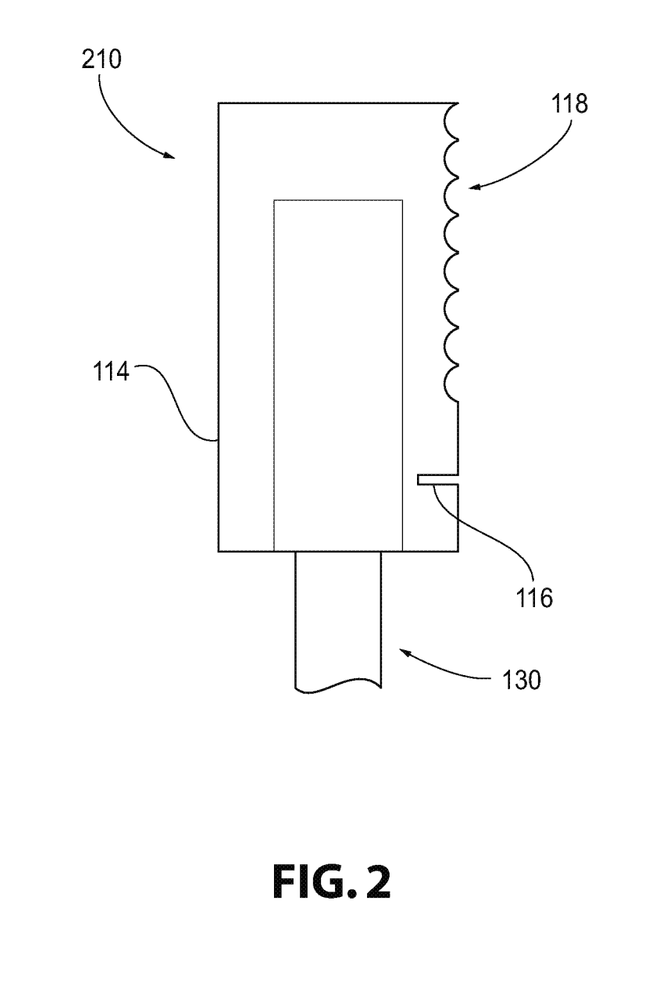
FIG. 2 depicts an illustrative example of a pliant blade of a utensil having contoured edges according to one or more embodiments shown and described herein.
Figure 3:
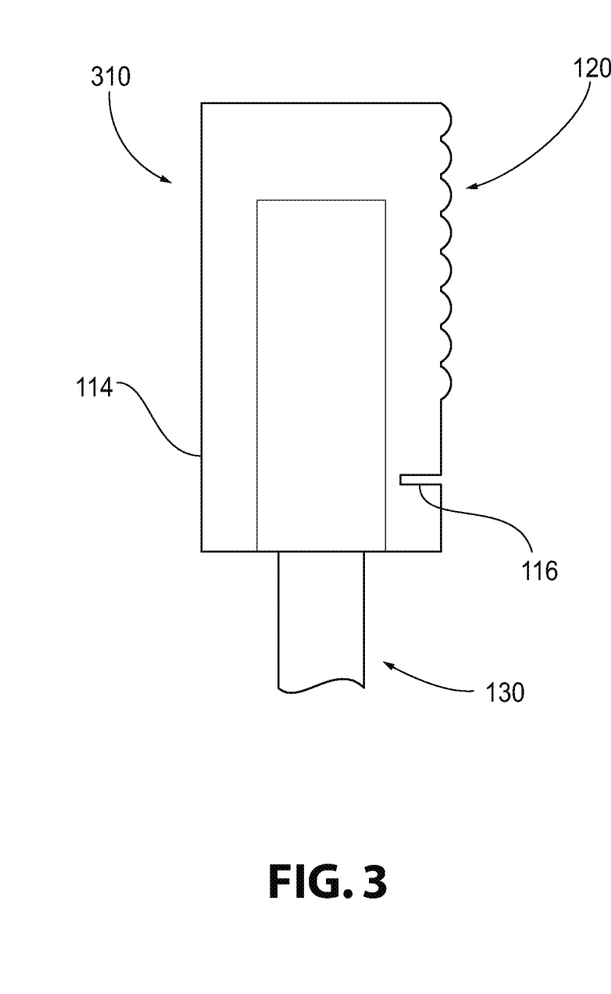
FIG. 3 depicts another illustrative example of a pliant blade of a utensil having contoured edges according to one or more embodiments shown and described herein.

Referring now to FIGS. 2 and 3, illustrative examples of a pliant blade 210 (FIG. 2) and 310 (FIG. 3) are depicted having contoured features 118 (FIG. 2) and 120 (FIG. 3). The contoured features 118 (FIG. 2) and 120 (FIG. 3) may be particularly constructed to efficiently remove thickened sauces, gravies, and collagenous, gelatin-like material from containers, as well as a sticky product that by its nature adheres to the containers and is not extracted quickly or easily by other means. This includes material that may be located in otherwise difficult to access areas, such as underneath lips, between ribs, within recesses, and/or the like. As shown in FIG. 2, the contoured features 118 include concave features extending along at least a portion of one of the lateral edges of the pair of lateral edges 114c and 114d of the pliant blade 210. Although the contoured features 118 are depicted with uniform size and spacing, in some embodiments, the contoured features 118 may be separated into individual, single concave features (i.e., spaced apart by other features or a uniform edge) or into independent separated groups of concave features disposed along the edge 114 of the pliant blade 210. That is, the arrangement and distribution of the contoured features 118 may correspond to the internal surface features of a sidewall of a container. For example, if the internal surface features of the sidewall of the container include convex ribbed structures, then the pliant blade 210 may be formed with contoured features 118 having concave features corresponding to the sidewall of the container.

Similarly, FIG. 3 depicts contoured features 120 including convex features extending along a portion of one of the lateral edges of the pair of lateral edges 114c and 114d of the pliant blade 310. Again, although the contoured features 120 are depicted with uniform size and spacing, in some embodiments, the contoured features 120 may be separated into individual, single concave features (i.e., spaced apart by other features or a uniform edge) or into independent separated groups of concave features disposed along the edge 114 of the pliant blade 310. That is, the arrangement and distribution of the contoured features 120 may depend on the internal surface features of a sidewall of a container. For example, if the internal surface features of the sidewall of the container include concave ribbed structures, then the pliant blade 310 may be formed with contoured features 118 having convex features corresponding to the sidewall of the container.

In some embodiments, the edge 114 of the pliant blade 210 or 310 may include a variety of intermixed contoured features 118 and 120. For example, a portion of the edge of the pliant blade 210 or 310 may include concave and/or convex features, e.g., a wavy concave-convex rib pattern. As such, the edge 114, for example, at least one of the lateral edges of the pair of lateral edges 114c and 114d of the pliant blade 210 or 310 may conform to (e.g., flush when applied with some pressure) the sidewalls of the container.

Figure 4:
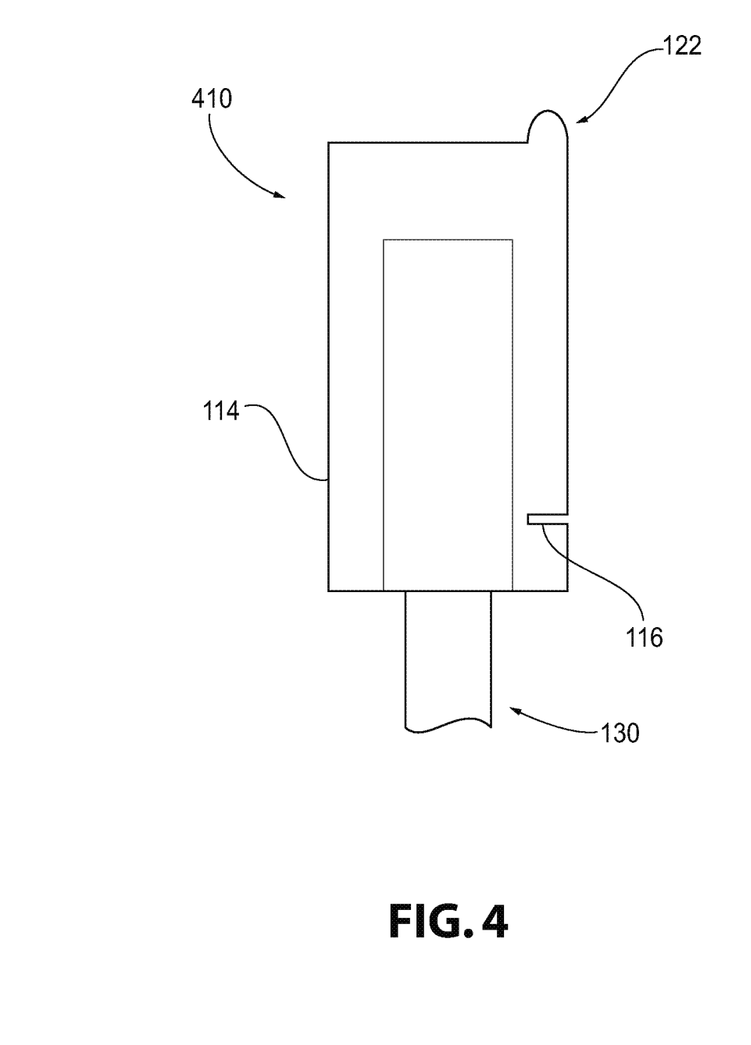
FIG. 4 depicts an illustrative example of a utensil having extensions disposed on a distal edge of the pliant blade according to one or more embodiments shown and described herein.
Figure 11:
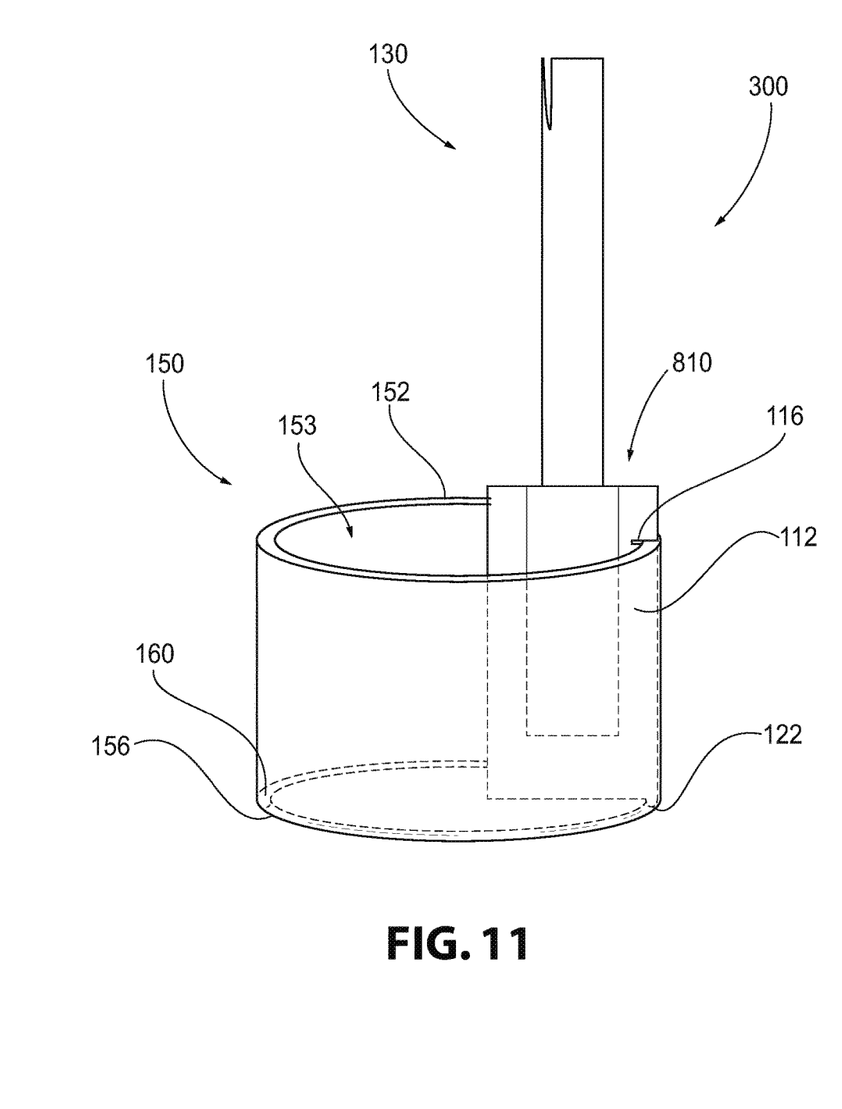
FIG. 11 depicts an illustrative example of the utensil in use to remove contents from the bottom of a container having a rib structure according to one or more embodiments shown and described herein.

In some embodiments, the distal edge 114a of the pliant blade 410 may include one or more pliant extensions 122 as shown, for example, in FIG. 4. Referring to FIG. 4, the one or more pliant extensions 122 may include a shape that conforms to the surface features of a bottom portion 156 (FIG. 11) of the container 150 (FIG. 11). While FIG. 4 depicts the one or more pliant extensions 122 as being configured along the distal edge 114a of the pliant blade 410 to conform to the ridges and valleys making up the bottom portion 156 of the container 150, the present disclosure is not limited to such. Generally, the bottom portion 156 of the container 150 includes surface features for increasing the strength of the bottom of the container 150. As discussed above, conventional utensils with a simple flat or curved distal edge 114a may fail to extract contents disposed within or between the ridges and valleys that make up the surface features of the bottom of the container. However, a utensil 100, as described herein, having one or more pliant extensions 122 that conforms to the size and shape of the surface features 158 of the bottom portion 156 of the container 150 (as shown and describer further with reference to FIG. 11) may efficiently and nearly or completely remove the contents from both flat bottoms and bottoms having surface features 158.

In some instances, it may be difficult to remove contents from a container where the container includes a lip that extends inwardly from the sidewall of the container. That is, some of the contents of the container may be difficult to extract with a conventional utensil as they are located underneath the lip of the container and a conventional utensil does not readily conform to the space underneath the lip, which traps the contents therein. Furthermore, it may be dangerous to remove contents from underneath the lip because the lip of the container tends to be sharp as a result of the removal of an inner portion of the lid, for example, by way of a pull-tab lid or a can opener, which cuts the lid material leaving sharp edges. However, a utensil 100, as described herein, which includes a slit 116 formed as part of the pliant blade 110 provides for an efficient cleaning of material or removal of contents from underneath the lip of the container.

Figure 5:
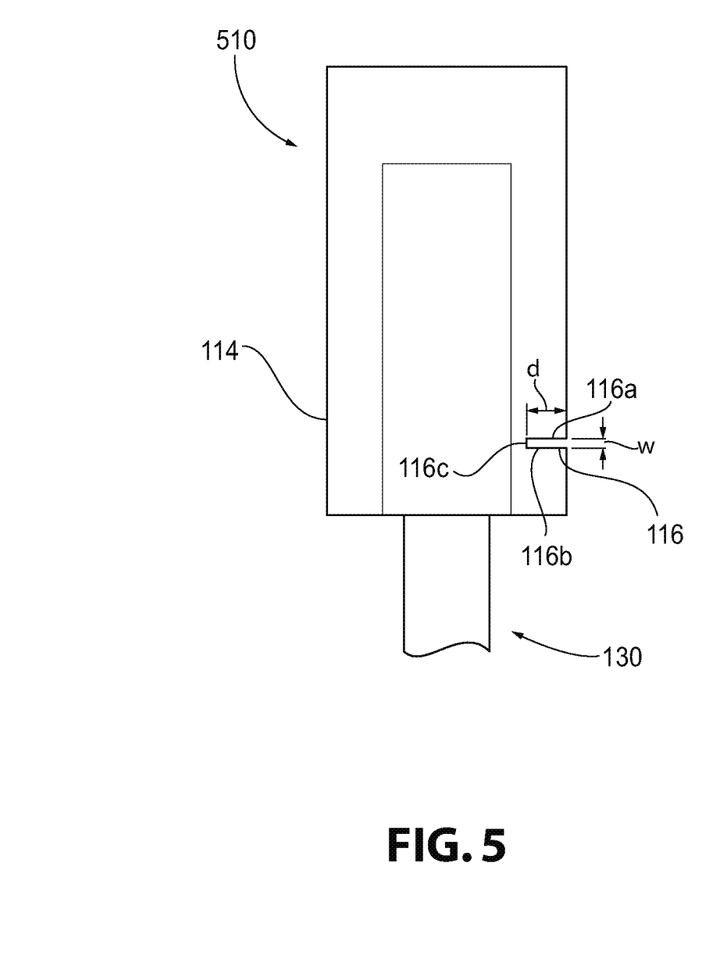
FIG. 5 depicts an illustrative example of a utensil having a pliant blade with a slit according to one or more embodiments shown and described herein.

Referring to FIG. 5, a pliant blade 510 is depicted having a slit 116. The slit 116 extends from an edge 114 of the pliant blade 510 toward the inner portion 112 to a depth d. The slit 116 may have a depth d such that when the slit 116 is configured with the lip of a container the edge 114 of the pliant blade 510 may contact the inner sidewall of the container in order to remove the contents along the sidewall and underneath the lip with the pliant blade 510. In some embodiments, the depth d of the slit 116 is from about 1 mm to about 20 mm, from about 1 mm to about 30 mm, from about 5 mm to about 10 mm, or the like, including all values and ranges thereof. Additionally, as shown the slit 116 may further be defined by a width w. The width w defines a spacing between a distal slit edge 116a and a proximal slit edge 116b of the slit 116. In some embodiments, the distal slit edge 116a and a proximal slit edge 116b may contact each other, i.e., has a width w of zero. In some embodiments, the width w may be from about 0 to about 10 mm, from about 0 to about 15 mm, from about 1 mm to about 5 mm, or the like, including all values and ranges thereof. In such embodiments, a slit 116 having a width greater than zero may allow the slit 116 to conform to a lip of a container that has a thickness greater the width of the slit 116 and/or surface contours such as ribs which may be formed from the joining of the lid of the container to the sidewall of the container. In some embodiments, the utensil 100 may comprise more than one slit 116 extending from one or more of the edges 114 of the pliant blade 110. For example, a utensil 100 may include a pliant blade 110 having one slit 116 disposed along each of the lateral edges 114c and 114d of the pliant blade 110.

In some embodiments, the slit 116 may have a taper edge. The taper edge may be, for example, thinner along a centerline defining the slit 116 along its depth d, than the thickness of the material comprising the inner portion 112 of the pliant blade 510, which is adjacent the centerline of the slit 116. As such, the width w of the slit 116 may be reduced to about zero while still achieving the ability of accommodating a lip of a container that has a thickness greater than the width of the slit 116 and/or surface contours such as ribs. However, in some embodiments, it is advantageous for the width w of the slit 116 to be smaller than the thickness of the lip of the container.

In some embodiments, the edges 116a, 116b, and 116c of the slit 116, for example, the distal slit edge 116a, the proximal slit edge 116b, and the inner edge 116c may be over molded or otherwise strengthened (e.g., with a material having a higher durometer than the material of the inner portion 112 of the pliant blade 510) to prevent the sharp edge of the lip from cutting or damaging the material of the pliant blade 510.

Figure 6:
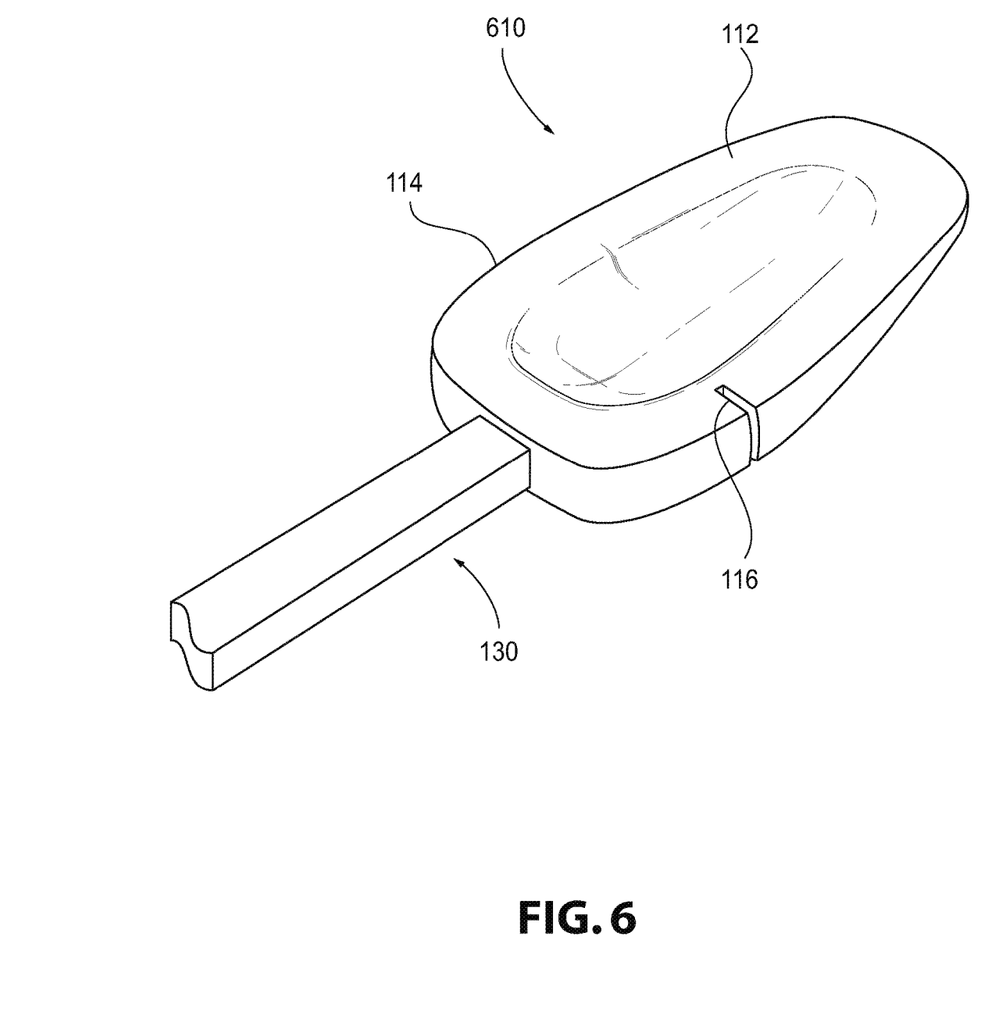
FIG. 6 depicts an illustrative example a utensil having a scoop shape pliant blade and a slit according to one or more embodiments shown and described herein.

In yet further embodiments, for example, as depicted in FIG. 6, the pliant blade 610 may be formed in a variety of shapes and sizes. For example, the pliant blade 610 may have a scoop shaped inner portion 112 defined by raised edges 114. Additionally, in some embodiments, the edges 114 of the pliant blade 610 may be curved or otherwise configured to form to a variety of container shapes and sizes. Although the pliant blade 610 may comprise a variety of shapes and sizes, a slit 116 may still be disposed extending from an edge 114 of the pliant blade 610 into, to a depth d, of an inner portion 112 of the pliant blade 610. For example, a scoop shaped or curved pliant blade 610 may allow for easier removal of product from a container than a conventional flat or convex utensil. In some embodiments, the thickness of the pliant blade 610 may decrease from the inner portion 112 to the edge 114. As such, the edges of the pliant blade 610 may more readily conform to various surface features and textures of a surface of a container. Although a scoop shaped and curved pliant blade 610 are depicted herein, other shapes, sizes and configurations may be made without departing from the spirit and scope of the claimed subject matter.

Figure 7:
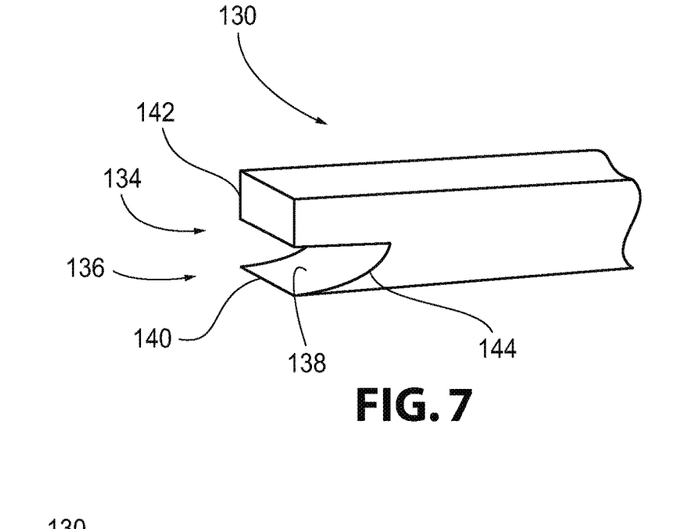
FIG. 7 depicts an illustrative example of pull-tab opener disposed on an end of a handle of the utensil according to one or more embodiments shown and described herein.
Figure 8:
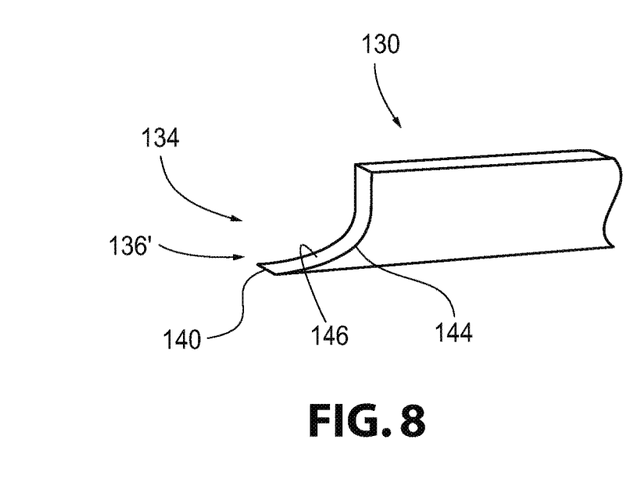
FIG. 8 depicts another illustrative example of pull-tab opener disposed on an end of a handle of the utensil according to one or more embodiments shown and described herein.
Figure 9:
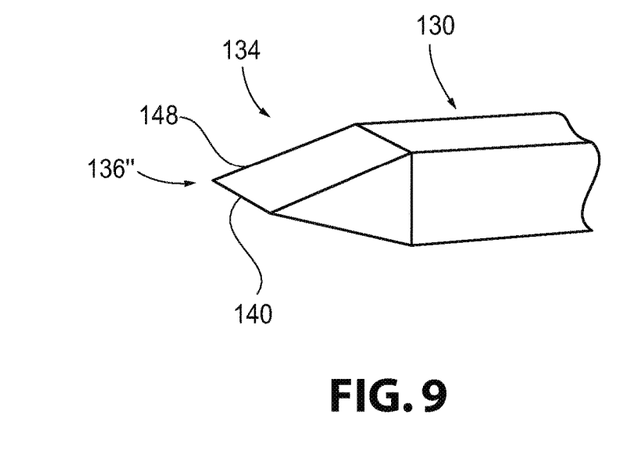
FIG. 9 depicts another illustrative example of pull-tab opener disposed on an end of a handle of the utensil according to one or more embodiments shown and described herein.

Turning now to the second end 134 of the elongated handle 130, a pull-tab opener 136 may be disposed therein to assist a user in accessing and separating a pull-tab from the surface of a lid of a container. Referring to FIGS. 7-9, a variety of pull-tab openers 136 are illustrated, but the present disclosure is not limited to those depicted herein. Referring to FIG. 7, a pull-tab opener 136 is configured as part of the second end 134 of the elongated handle 130. In some embodiments, the pull-tab opener 136 comprises an undercut 138 formed in the second end 134 of the elongated handle 130 resulting in a leading edge 140 separated from an upper portion 142 by a space formed from the removal or absence of material there between (i.e., an undercut 138).

Figure 12:
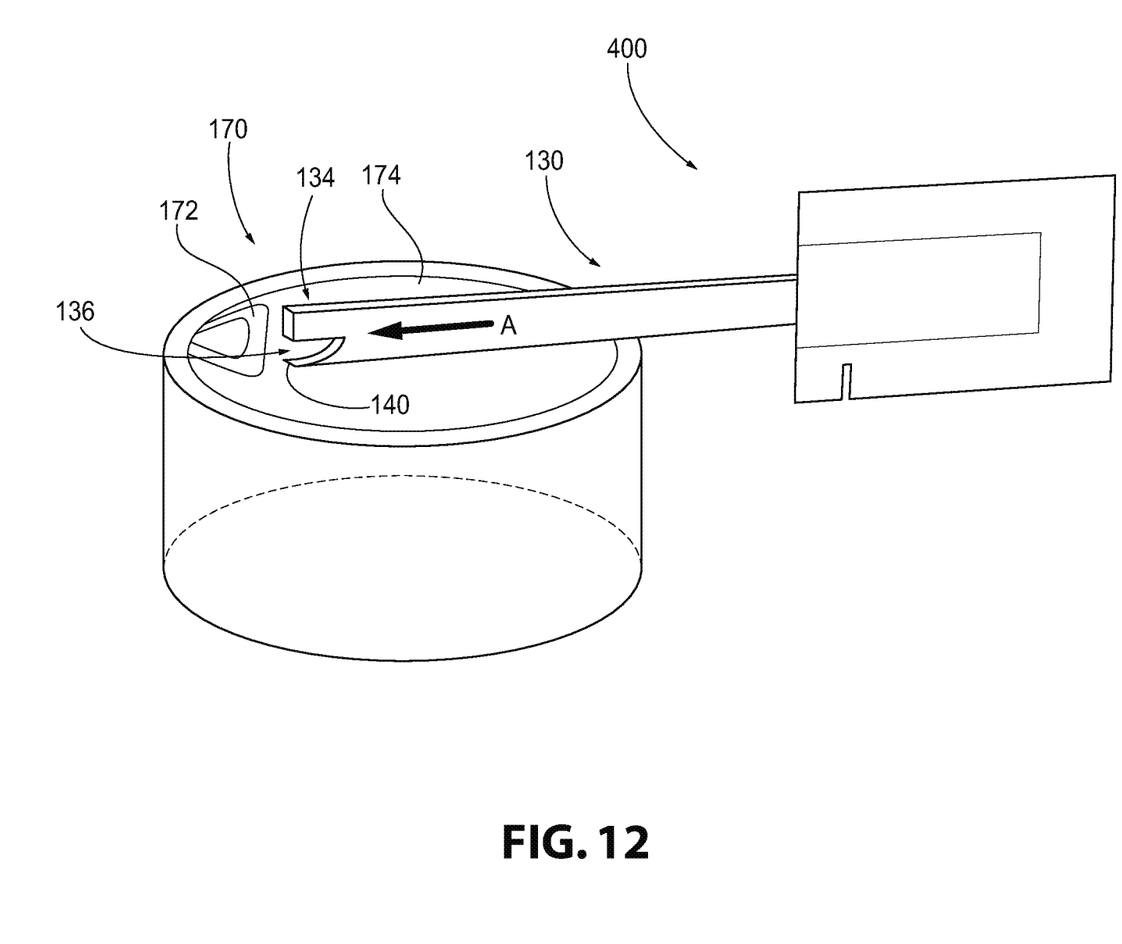
FIG. 12 depicts an illustrative example of the pull-tab opener of the utensil in use to access and separate the pull-tab from the surface of the lid of the container according to one or more embodiments shown and described herein.

Further, the undercut 138 may include a radius 144 extending from the leading edge 140 to the upper portion 142. The radius 144 provides a mechanism, which as shown and described with reference to FIGS. 12-13c, that separates the pull-tab from the surface of the lid as the leading edge 140 of the pull-tab opener 136 in slid between the pull-tab and the surface of the lid.

Referring now to FIG. 8, the pull-tab opener 136' illustrated herein includes an extension portion 146 from the second end 134 of the elongated handle 130. That is, a radius 144 extends from the second end 134 of the elongated handle 130 to form a leading edge 140. As briefly discussed above and in more detail with reference to FIGS. 12-13c, as the leading edge 140 is inserted between the pull-tab 172 and the surface of the lid, the pull-tab 172 is separated from the surface of the lid by the radius 144 thereby providing easier access to the pull-tab 172 for extracting the pull-tab lid 174 from the container.

In a third example embodiment, FIG. 9 depicts a pull-tab opener 136" having a leading edge 140 formed from one or more taper angles 148 extending from the second end 134 of the elongated handle 130. Here, instead of a radius 144 being used to separate the pull-tab from the surface of the lid, a taper angle 148 extending from the second end 134 of the elongated handle 130 facilitates the separation. Although three particular embodiments of the pull-tab opener (e.g. 136, 136', and 136") are illustrated and described herein, other configurations of a pull-tab opener 136 disposed on the second end 134 of the elongated handle 130 may be implemented to achieve the functionality of accessing and separating the pull-tab from the surface of the lid. In some embodiments, a first taper angle of the one or more taper angles 148 extending from the second end 134 of the elongated handle 130 may have an angle (i.e., measured from a zero line which extends in a direction generally parallel to the elongated handle) that is greater than a second taper angle of the one or more taper angles 148, thereby forming a wedge shape extending from the second end 134. A leading edge 140 may be formed where the surfaces formed by the first and second taper angles converge. The leading edge 140 may have a curved contour that defines the width of the pull-tab opener 136, as opposed to the leading edge 140 as shown in FIG. 9 that has a relatively straight contour that defines the width of the pull-tab opener 136. In some embodiments, a hole may be disposed through the pull-tab opener 136 such that a user may hang the utensil 100 on a hook.

Figure 10:
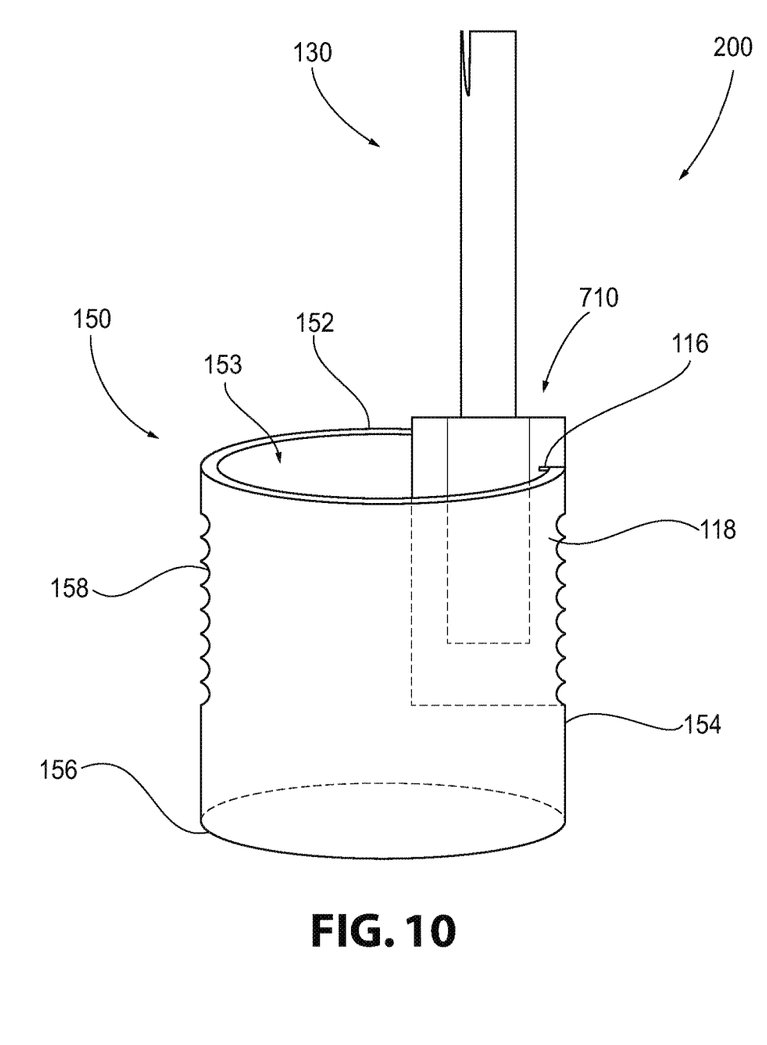
FIG. 10 depicts an illustrative example of the utensil in use to remove contents from the underside of a lip of a container and from the contours of the sidewall of the container according to one or more embodiments shown and described herein.

Referring now to FIG. 10, an illustration of a utensil 200 in use is depicted. Utensil 200 includes an elongated handle 130 coupled to a pliant blade 710 where the pliant blade 710 is inserted into an opening 153 of a container 150. The container 150 includes an opening 153 having a lip 152 defining the perimeter of the opening 153. The container 150 further includes sidewall 154 extending from the lip 152 to a bottom portion 156. A portion of the sidewall 154 includes surface features 158 depicted as convex ribs along the inner surface of the sidewall 154 of the container 150. The utensil 200 depicted in use in FIG. 10 further includes a pliant blade 710 having a slit 116 and a contoured feature 118. In some embodiments, to extract the contents from the container 150 which may be trapped under the lip 152 the slit 116 of the pliant blade 710 may be positioned such that the lip 152 is disposed within the slit 116 of the pliant blade 710. As such, when the utensil 200 traverses the perimeter (i.e., the lip 152) of the opening 153, a portion of the pliant blade 710 below the slit 116 extracts the contents trapped therein. Furthermore, the interface between the slit 116 of the pliant blade 710 and lip 152 (i.e., the portion of the pliant blade 710 above the slit 116 and the portion of the pliant blade 710 below the slit 116 with the lip 152 disposed there between) may facilitate an interference fit between the slit 116 and the lip 152. This interference fit may improve the extraction of contents trapped below the lip 152 as the portion of the pliant blade 710 disposed above the lip 152 forces a friction fit or seal between the portion of the pliant blade 710 below the lip 152 and the lip 152. Additionally, as the utensil 200 is manipulated along the perimeter of the opening 153 of the container 150 (i.e., the lip 152), the slit 116 and lip 152 interface provide resistance from the pliant blade 710 slipping away from the lip 152, thereby more efficiently extracting contents from underneath the lip 152.

As further depicted in FIG. 10, the pliant blade 710 includes a contoured feature 118 along an edge of the pliant blade 710. As described above, contents in the container 150 may become trapped in the surface features 158 of the sidewall 154 of the container 150; unfortunately, a conventional utensil includes a malleable material that does not efficiently conform to the surface features 158 of the sidewall 154. However, as proposed herein, a utensil 200 having a pliant blade 710, which includes a contoured feature 118, may more readily and efficiently conform to the surface features 158 of the sidewall 154. FIG. 10 depicts an instance where the contoured feature 118 is particularly configured with concave features corresponding to the convex surface features 158 (e.g. rib structure) of the sidewall 154 of the container 150. As such, any contents trapped between adjacent convex rib structures may be removed.

Referring now to FIG. 11, another example implementation of a utensil 300 extracting contents from a container 150 is depicted. In FIG. 11, the utensil 300 includes an elongated handle 130 coupled to a pliant blade 810 where the pliant blade 810 is inserted into an opening 153 of the container 150. The container 150 includes an opening 153 having a lip 152 defining the perimeter of the opening 153. The container 150 further includes a sidewall 154 extending from the lip 152 to a bottom portion 156. The bottom portion 156 includes a rib structure 160 disposed inwardly from the sidewall 154 and about the perimeter of the bottom portion 156. In some instances, contents may reside within the contours of the bottom portion 156, such as those formed from, for example, the rib structure 160. As such, a utensil 300 having one or more pliant extensions 122 on the distal edge of the pliant blade 810 are needed to efficiently extract the contents. When the utensil 300 is inserted into the container 150, the one or more pliant extensions 122 may conform to the contour of the bottom portion 156 of the container 150. As the utensil 300 is manipulated around the perimeter of the container 150, the one or more pliant extensions 122 extract the contents residing in the contours of the bottom portion 156 of the container 150.

Additionally, as similarly described with reference to FIG. 10 above, FIG. 11 depicts a slit 116 in the pliant blade 810 positioned such that the lip 152 of the container 150 is disposed within the slit 116. With the lip 152 positioned within the slit 116, the pliant blade 810 may readily and efficiently remove contents trapped underneath the lip 152 of the container 150.

Figure 13A:
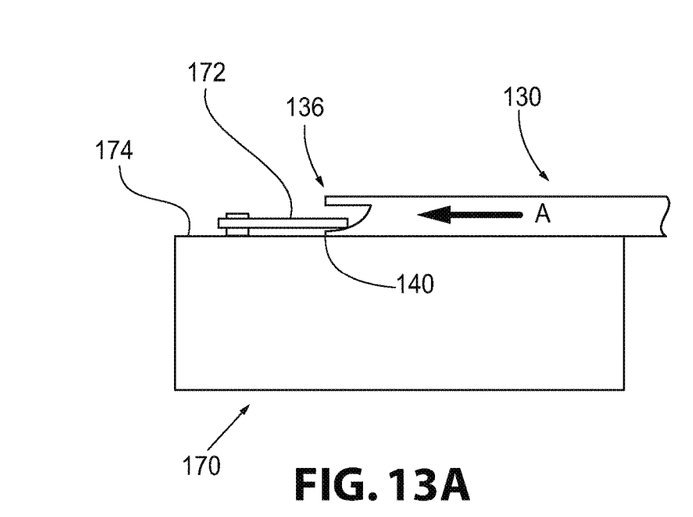
FIG. 13a depicts an illustrative example of using the utensil where the leading edge of the pull-tab opener positioned between the pull-tab and the lid surface of a container according to one or more embodiments shown and described herein.
Figure 13B:
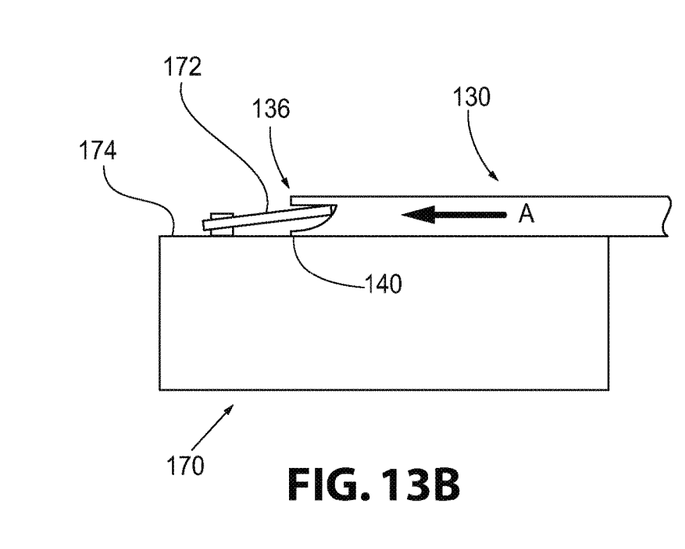
FIG. 13b depicts an illustrative example of using the utensil where the leading edge of the pull-tab opener is slid between the pull-tab and the lid surface of the container according to one or more embodiments shown and described herein.
Figure 13C:
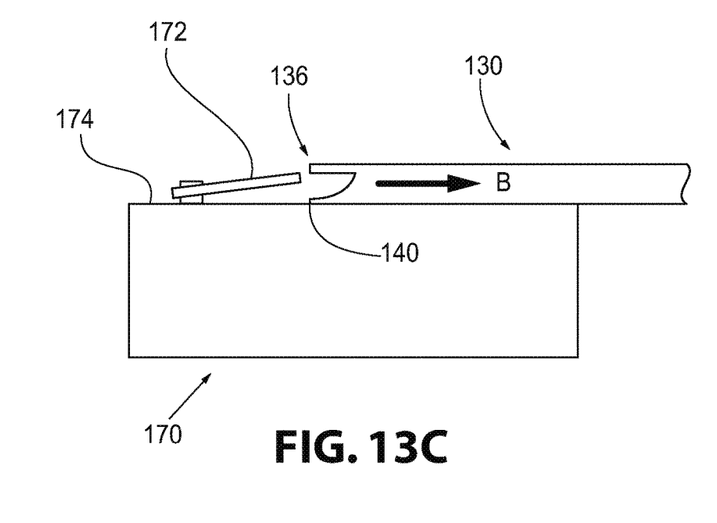
FIG. 13c depicts an illustrative example of using the utensil where the pull-tab is separated from the lid surface of the container by the pull-tab opener of the utensil according to one or more embodiments shown and described herein.

Referring now to FIGS. 12 and 13a-13c, illustrative examples of a utensil 400 having a pull-tab opener 136 being used to access and separate a pull-tab 172 from a lid surface 174 of a container 170 are depicted. The utensil 400 includes a pull-tab opener 136 disposed on a second end 134 of the elongated handle 130. In some instances, the pull-tab 172 is flush with the lid surface 174 of the container 170. In some situations, it is difficult to access and separate the pull-tab 172 from the lid surface 174 of the container 170. However, a pull-tab opener 136 having a leading edge 140 may assist in resolving this difficulty. The leading edge 140 of the pull-tab opener 136 may be positioned adjacent to the pull-tab 172 and then a portion of the pull-tab opener 136 may be slid (e.g., in a direction indicated by arrow A) between the pull-tab 172 and the lid surface 174. FIG. 13*a* depicts a cross-section illustrative example of the leading edge 140 of the pull-tab opener 136 positioned between the pull-tab 172 and the lid surface 174. Continuing to FIG. 13*b*, as the pull-tab opener 136 is slid using the elongated handle 130 in the direction indicated by arrow A, the pull-tab 172 is separated from the lid surface 174. In some embodiments, the separation is facilitated by a radius 144 of the pull-tab opener 136, which guides the pull-tab 172 away from the lid surface 174 as the leading edge 140 of the pull-tab opener 136 slides further under the pull-tab 172. Finally, as shown in FIG. 13*c*, when the pull-tab opener 136 disposed on the second end 134 of the elongated handle 130 of the utensil 400 is extracted, as indicated by arrow B, the pull-tab 172 remains separated from the lid surface 174 and ready for complete extraction. In some embodiments, the pull-tab opener 136 in conjunction with the elongated handle 130 of the utensil 400 may completely extract the pull-tab 172 and/or the lid which it is coupled to, thereby opening the container 170.

Referring to FIGS. 10-13*c*, it should be understood that a person may use the utensil to open a container having a pull-tab and extract the contents therein by following a few steps. To open the container, a user may position a leading edge of a pull-tab opener disposed on a second end of an elongated handle between a surface of a lid of a container and a pull-tab coupled to the lid. The user may then separate the pull-tab from the surface of the lid using the pull-tab opener disposed on the second end of the elongated handle. To extract the contents from the container, the user may insert a pliant blade coupled to a first end of the elongated handle into the container and extract contents from the container using the pliant blade coupled to the first end of the elongated handle. In some embodiments, the user may remove the contents from an underside of a lip of the container by positioning the lip within a slit disposed in the pliant blade where the slit extends from an edge of the pliant blade inwardly into a portion of an inner portion of the pliant blade and manipulating the pliant blade about the lip of the container. Additionally, in some embodiments, the user may remove the contents from a rigid bottom portion of the container by positioning one or more pliant extensions disposed on a distal edge of the pliant blade adjacent to the rigid bottom portion of the container and manipulating the pliant blade about the rigid bottom portion of the container.

It should now be understood that embodiments described herein are directed to a utensil particularly suited for removing contents from a container having one or more surface features in which at least a portion of the contents in the container may be located. Additionally, it should be understood that embodiments described herein relate to methods of use of the utensil in extracting contents from a container and facilitating the opening of a pull-tab lid of the container. In general, the utensil includes an elongated handle having a first end coupled to a pliant blade and a second end having a pull-tab opener disposed thereon. Additionally, the pliant blade may include a slit disposed along one of the edges of the pliant blade and extending into an inner portion. The edges of the pliant blade my further include a contoured feature and/or one or more pliant extensions for efficiently conforming to surface features of the sidewall and/or bottom of the container.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A utensil comprising:
    an elongated handle having a first end and a second end;
    a pliant blade comprising an inner portion defined by an edge extending around a perimeter of the inner portion, wherein:
        the pliant blade is coupled to the first end of the elongated handle; and
    a slit extending from the edge of the pliant blade inwardly into a section of the inner portion, wherein the slit includes an inner edge defined by a depth from the edge of the pliant blade inwardly into the inner portion of the pliant blade and a distal slit edge opposite a proximal slit edge, wherein the distal slit edge contacts the proximal slit edge.

2. The utensil of claim 1, further comprising a pull-tab opener disposed on the second end of the elongated handle, wherein the pull-tab opener comprises a leading edge extending from the second end of the elongated handle such that the leading edge is capable of sliding between a surface of a lid of a container and a pull-tab of the container for separating the pull-tab from the surface of the lid.

3. The utensil of claim 2, wherein the pull-tab opener comprises an undercut formed in the second end of the elongated handle resulting in a leading edge separated from an upper portion by a space formed from the removal or absence of material therebetween, wherein the undercut includes the leading edge.

4. The utensil of claim 1, further comprising a pull-tab opener disposed on the second end of the elongated handle, wherein the pull-tab opener comprises an undercut formed in the second end of the elongated handle such that a leading edge is formed and the leading edge is capable of sliding between a surface of a lid and a pull-tab for separating the pull-tab from the surface of the lid.

5. The utensil of claim 1, wherein:
    the edge includes a pair of lateral edges, a distal edge, and a proximal edge,
    the pair of lateral edges define a plane with the distal edge and the proximal edge, and
    the pair of lateral edges are separated from each other by the distal edge and the proximal edge such that a pair of square corners is formed by each of the lateral edges and the distal edge.

6. The utensil of claim 5, wherein the pliant blade further comprises one or more pliant extensions extending from the distal edge of the pliant blade.

7. The utensil of claim 6, wherein the one or more pliant extensions are rounded such that the pliant extensions are capable of removing contents from containers having surface features on a bottom of the container.

8. The utensil of claim 5, wherein at least one lateral edge of the pair of lateral edges comprises a plurality of convex features protruding from the at least one lateral edge.

9. The utensil of claim 8 wherein the convex features protruding from the at least one lateral edge comprise rounded protrusions positioned sequentially adjacent each other.

10. A utensil comprising:
an elongated handle having a first end and a second end;
a pliant blade coupled to the first end of the elongated handle, the pliant blade comprising an edge enclosing an inner portion, wherein:
the edge includes a pair of lateral edges, a distal edge, and a proximal edge,
the pair of lateral edges define a plane with the distal edge and the proximal edge, and
the pair of lateral edges are separated from each other by the distal edge and the proximal edge such that a pair of square corners is formed by each of the lateral edges and the distal edge; and
a slit extending from the edge of the pliant blade inwardly into a section of the inner portion, wherein the slit includes an inner edge defined by a depth from the edge of the pliant blade inwardly into the inner portion of the pliant blade and a distal slit edge opposite a proximal slit edge, wherein the distal slit edge contacts the proximal slit edge.

11. The utensil of claim 10, wherein one or more pliant extensions are disposed on the distal edge of the pliant blade such that the one or more pliant extensions are configured to conform to one or more contours on a bottom of the container to remove contents from the one or more contours.

12. The utensil of claim 10, wherein the pliant blade comprises a contoured edge corresponding to one or more surface features of a sidewall of the container.

13. The utensil of claim 12, wherein the contoured edge comprises one or more concave features.

14. The utensil of claim 13, wherein the one or more concave features form a rib pattern along the contoured edge of the pliant blade.

15. The utensil of claim 12, wherein the contoured edge comprises one or more convex features.

16. The utensil of claim 15, wherein the one or more convex features form a rib pattern along the contoured edge of the pliant blade.

17. The utensil of claim 10, wherein at least one lateral edge of the pair of lateral edges comprises a plurality of convex features protruding from the at least one lateral edge.

18. The utensil of claim 17, wherein the convex features protruding from the at least one lateral edge comprise a plurality of rounded protrusions positioned sequentially adjacent each other.

19. A utensil comprising:
an elongated handle having a first end and a second end;
a pliant blade coupled to the first end of the elongated handle, the pliant blade comprising an edge enclosing an inner portion, wherein:
the edge includes a pair of lateral edges, a distal edge, and a proximal edge,
the pair of lateral edges define a plane with the distal edge and the proximal edge, and
the pair of lateral edges are separated from each other by the distal edge and the proximal edge such that a pair of square corners is formed by each of the lateral edges and the distal edge;
a slit extending from the edge of the pliant blade inwardly into a section of the inner portion, wherein the slit includes an inner edge defined by a depth from the edge of the pliant blade inwardly into the inner portion of the pliant blade and a distal slit edge opposite a proximal slit edge, wherein the distal slit edge contacts the proximal slit edge;
at least one lateral edge of the pair of lateral edges comprises a plurality of convex features protruding from the at least one lateral edge; and
a pull-tab opener disposed on the second end of the elongated handle.

20. The utensil of claim 19 wherein the pull-tab opener comprises a leading edge extending from the second end of the elongated handle such that the leading edge is capable of sliding between a surface of a lid of the container and a pull-tab of the container for separating the pull-tab from the surface of the lid.

* * * * *